(12) United States Patent
Hagspiel et al.

(10) Patent No.: US 12,703,341 B2
(45) Date of Patent: Aug. 11, 2026

(54) FASTENING SYSTEM AND HYDRAULIC DEVICE HAVING THE SAME FASTENING SYSTEM

(71) Applicant: Robert Bosch GmbH, Stuttgart (DE)

(72) Inventors: Martin Hagspiel, Rettenberg (DE); Marc Orriols Brunetti, Kempten (DE); Maximilian Wilhelm, Buchenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 157 days.

(21) Appl. No.: 18/690,346

(22) PCT Filed: Jan. 25, 2023

(86) PCT No.: PCT/EP2023/051775
§ 371 (c)(1),
(2) Date: Mar. 8, 2024

(87) PCT Pub. No.: WO2023/156157
PCT Pub. Date: Aug. 24, 2023

(65) Prior Publication Data

US 2024/0409078 A1 Dec. 12, 2024

(30) Foreign Application Priority Data

Feb. 18, 2022 (DE) ..................... 10 2022 201 700.5

(51) Int. Cl.
*F15B 15/14* (2006.01)
*B60T 17/08* (2006.01)

(52) U.S. Cl.
CPC .......... *B60T 17/08* (2013.01); *F15B 15/1423* (2013.01)

(58) Field of Classification Search
CPC .............. F15B 15/1423; F15B 15/1438; F15B 2215/30; B60T 8/368; B60T 17/00; B60T 17/08; B21D 39/026; B21D 39/028
See application file for complete search history.

(56) References Cited

U.S. PATENT DOCUMENTS 7,883,158 B2 * 2/2011 Reiner .................... H02K 7/14 303/116.4
9,234,531 B2 1/2016 Wald et al.
(Continued)

FOREIGN PATENT DOCUMENTS

DE 102019219438 A1 6/2021
DE 102022201582 A1 8/2023
(Continued)

OTHER PUBLICATIONS

International Search Report for PCT/EP2023/051775, Issued May 4, 2023.

*Primary Examiner* — Michael Leslie
(74) *Attorney, Agent, or Firm* — NORTON ROSE FULBRIGHT US LLP

(57) ABSTRACT

A fastening system for fastening an annular body, in particular a covering cap, end shield, or the like. The fasting system includes an annularly extending side wall having an outer side and an inner side and comprising a collar which projects radially from the outer side, to an element, in particular a housing, hydraulic block or the like, which includes a receiving region for the collar. For fastening the annular body to the element, the element is or will be plastically deformed in such a way that the material of the element is or will be displaced to engage behind the collar. The element includes an annular recess having a caulkable lateral outer wall and having a retaining contour which is radially spaced apart from the lateral outer wall. The retain- (Continued)

ing contour is configured to interact in a form-fitting manner with the collar.

17 Claims, 3 Drawing Sheets

(56) References Cited

U.S. PATENT DOCUMENTS

| | | | | |
|---|---|---|---|---|
| 11,708,825 | B2 * | 7/2023 | Weh | B60T 17/00 92/169.1 |
| 12,252,103 | B2 * | 3/2025 | Weh | F15B 15/1428 |
| 12,325,393 | B2 * | 6/2025 | Weh | B60T 7/04 |
| 2020/0063881 | A1 | 2/2020 | Sagayama | |
| 2021/0388829 | A1 | 12/2021 | Weh et al. | |
| 2022/0144238 | A1 | 5/2022 | Weh et al. | |

FOREIGN PATENT DOCUMENTS

| | | | |
|---|---|---|---|
| GB | 2295436 | A | 5/1996 |
| JP | 2023503939 | A | 2/2023 |

* cited by examiner

FASTENING SYSTEM AND HYDRAULIC DEVICE HAVING THE SAME FASTENING SYSTEM

FIELD

The present invention relates to a fastening system for fastening an annular body, in particular a covering cap, end shield or the like, which comprises an annularly extending side wall having an outer side and an inner side and comprising a collar which projects radially from the outer side, to an element, in particular a housing, hydraulic block or the like, which comprises a receiving region for the collar, wherein, for fastening the annular body to the element, the element is or will be plastically deformed in such a way that the material of the element is or will be displaced to engage behind the collar.

The present invention also relates to a hydraulic device, in particular a braking device for a motor vehicle, preferably a brake booster, comprising an element which is configured as a hydraulic block and comprises at least one opening for forming a hydraulic chamber, and comprising at least one annular body which is configured as a covering cap and/or end shield and closes the opening, wherein the annular body is fastened to the element by the above-described fastening system.

BACKGROUND INFORMATION

Fastening systems of the aforementioned type mentioned are described in the related art. In hydraulic systems, such as hydraulic brake systems, hydraulic blocks are used, among other things, to conduct and distribute hydraulic media For this purpose, a bore, is introduced into a hydraulic block, for example, which then forms a hydraulic chamber. To close the bore or the chamber, said bore or chamber is covered with a separate covering cap that is fastened to the hydraulic block. It is conventional to place a covering cap on the hydraulic block and then plastically deform the hydraulic block in such a way that the covering cap is held on it in a form-fitting manner. To simplify this process, covering caps may conventionally comprise a radially outward projecting collar behind which the material of the hydraulic block that has been displaced or caulked by a caulking process engages.

SUMMARY

A fastening system according to the present invention may have the advantage that the integrity of body and element is durably ensured, both during the connection process and at a later time. This requires only a minor modification to conventional fastening systems, but this can be implemented without much additional effort. According to an example embodiment of the present invention, in the fastening system according to the present invention, the element comprises an annular recess with a caulkable lateral outer wall and with a retaining contour which is radially spaced apart from the lateral outer wall, wherein the retaining contour is configured to interact in a form-fitting manner with the collar at least in a direction facing away from the lateral outer wall. The retaining contour ensures that caulking the element does not cause the side wall of the annular body to move away radially inward and thereby becoming detached from the element. The retaining contour also ensures that the caulking remains permanently tight and resilient even during later operation of the system formed by the annular body and the element. Even when acted on by external or internal, in particular hydraulic forces, the side wall is prevented from being displaced inward and thereby becoming detached from the caulking of the element According to a preferred further development of the present invention, the side wall and the recess are both configured such that they extend in a circular ring-shaped manner. The circular ring shape advantageously prevents incorrect assembly of the annular body and the element to one another. On the other hand, the circular ring shape ensures advantageous interaction between the element and the annular body, in particular during the caulking process, because forces are evenly distributed and transmitted.

The collar particularly preferably ends radially spaced apart from the lateral outer wall of the recess. The collar consequently cannot be scratched or damaged on its radially outer side by the element during the caulking process, in particular when the annular body is inserted into the recess of the element. This ensures that the caulked material of the element rests in a sealing manner against the annular body, in particular the collar.

According to an alternative embodiment of the present invention, the collar forms an interference fit with the lateral outer wall of the recess. This ensures a secure fastening of the ring element to the element even before caulking, so that the caulking process can be carried out safely.

According to an example embodiment of the present invention, it is furthermore preferably provided that the recess comprises an annular projection which projects radially from the lateral outer wall into the recess to form the interference fit; i.e. a radial projection that extends in a web-like manner over the entire perimeter of the lateral outer wall. The additional annular projection forms a section in the recess that serves to form the interference fit, so that an axially separate section of the recess, in particular the axially adjacent section of the recess, ensures play during assembly, in particular radial play, in relation to the collar at all times. The collar can thus be inserted on the lateral outer wall without contact, at least in this section. There is therefore now a section that creates the interference fit and a section that enters the recess without damage, in particular without scratches, so that this last-mentioned section provides the tight connection between elements annular body during subsequent caulking. The contact-free section is therefore the sealing section of the lateral outer wall.

According to an example embodiment of the present invention, it is furthermore preferably provided that the retaining contour is configured as a lateral inner wall of the recess opposite to the lateral outer wall. The recess is thus configured in the manner of an annular groove in the element into which the annular body with the side wall and the collar can be axially inserted. The lateral inner wall ensures that the side wall of the annular body is supported during the caulking process, which ensures a secure connection of annular body and element when caulking the element.

It is furthermore preferably provided that the lateral inner wall is configured such that it extends at least substantially parallel to the lateral outer wall. The caulking forces on the lateral inner wall can thus advantageously be transmitted to the element.

The lateral inner wall is particularly preferably configured to form an interference fit with the inner side of the side wall of the annular body. During assembly, the annular body can therefore first be pushed or pressed onto the lateral inner wall to form the interference fit. The press fit ensures that the annular body is already prefastened to the element, which, on the one hand, supports the caulking process and, on the other hand, improves the tightness of the system.

According to a preferred further development of the present invention, the retaining contour is formed by an inclined base of the recess. In this case, the recess can be a first section of a stepped bore, which in particular also forms the hydraulic chamber, so that the recess does not have a lateral inner wall that extends parallel to the lateral outer wall. The oblique orientation of the base nonetheless provides abutting contact, against which the side wall can be supported, in particular during caulking, to the side wall of the annular body during caulking.

The retaining contour is particularly preferably formed by an annular groove formed in a base of the recess which is oriented perpendicular to the lateral outer wall. The collar or the side wall then preferably comprises an annular projection on its end face that can be inserted into the annular groove. During assembly, the side wall with the annular projection is therefore pushed into the recess in such a way that the annular projection enters the annular groove and is thus held on the element in a form-fitting manner transverse to the insertion direction. This also improves the caulking process due to the advantageous retaining contour thanks to the annular groove and the annular projection. Viewed in cross-section, the annular projection is preferably tooth-shaped, conical, V-shaped or U-shaped, so that the annular projection can be inserted into the annular groove in a self-centering manner.

According to a preferred further development of the present invention, the lateral inner wall comprises an undercut. The undercut increases the clear width of the recess in the insertion direction of the annular body. During caulking, the caulking forces acting on the annular body move the side wall at least partially into the undercut, as a result of which the annular body is connected in a form-fitting manner to the element in the recess on its inner side of the side wall as well. This advantageously increases the load capacity of the system formed by the annular body and the element.

It is furthermore preferably provided that the collar comprises a projection which projects radially outward for forming the press fit and, axially spaced apart from the projection, a sealing section, wherein the sealing section is configured to interact in a sealing manner with the caulked material of the element. As already described above in reference to the pressing projection of the recess, the configuration of the pressing section and the sealing section ensures that the sealing section cannot be damaged during assembly of the annular body, which ensures maximum tightness after the caulking process.

According to a preferred further development of the present invention, the element or the annular body comprises at least one elastically deformable sealing element, which interacts in a sealing manner with the annular body or the element. For this purpose, the sealing element is in particular disposed such that it is elastically tensioned or deformed between the annular body and the element when they are joined in order to ensure a high sealing effect. The sealing element is preferably a sealant or a sealing ring, such as an O-ring. The sealing element in particular extends over the entire perimeter of the annular recess and/or the annular side wall of the annular body.

A hydraulic device according to the present invention includes the configuration according to the present invention of the fastening system. This results in the aforementioned advantages. Further advantages, preferred features and combinations of features emerge in particular from the above-described embodiments and from the rest of the disclosure herein.

The present invention will be explained in more detail in the following with reference to the figures.

DETAILED DESCRIPTION OF EXAMPLE EMBODIMENTS

Figure 1:
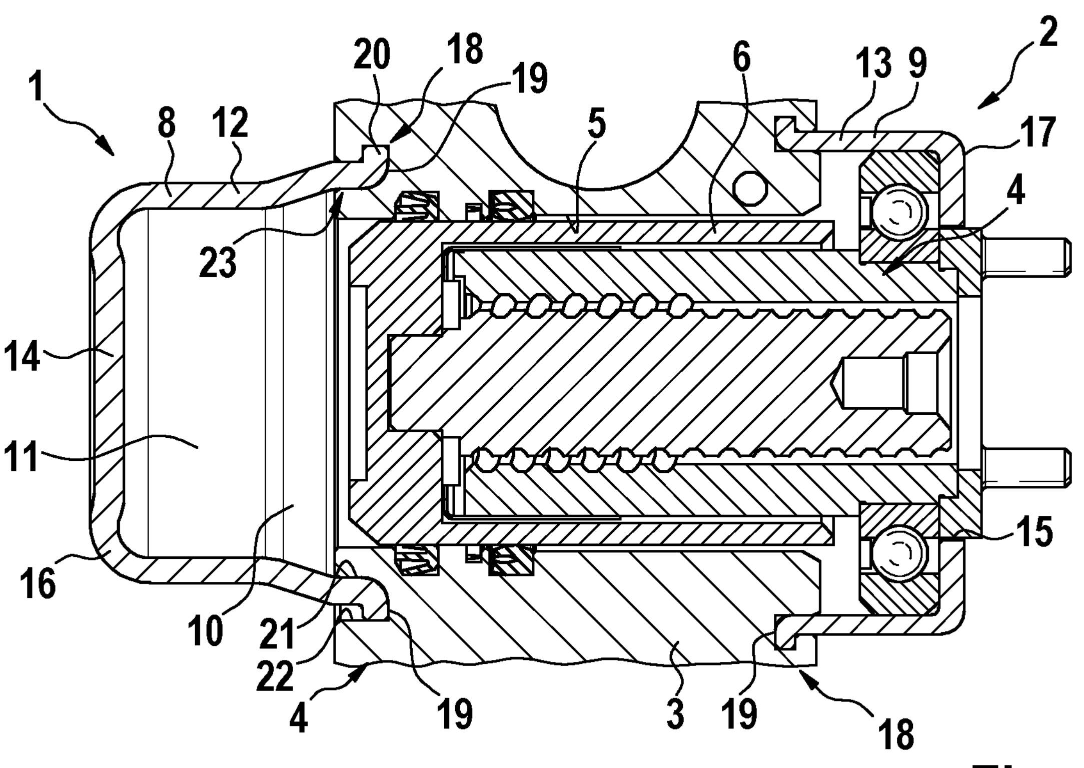
FIG. 1 shows an advantageous hydraulic system in a simplified longitudinal sectional view according to a first embodiment example of the present invention.

FIG. 1 shows a simplified longitudinal sectional view of an advantageous hydraulic device 1, which is configured as an electromechanical brake booster 2. The hydraulic device 1 comprises an element 4 configured as a hydraulic block 3. The hydraulic block 3, which is in particular made of aluminum, comprises a through-bore 5 in which an axially displaceable hydraulic piston 6 and a spindle gear 7, which can be operated by an electric motor and through which the hydraulic piston 6 can be moved, are mounted. A covering cap 8 and a covering cap 9, which enclose a chamber 10 in which the hydraulic piston 6 and the spindle gear box 7 are also located, are associated with the through-bore 5. The covering cap 9 is in particular also configured as an end shield which carries a rolling element bearing that supports the spindle gear 7. The covering cap 8 is configured as a closure cap that closes a hydraulic chamber between the covering cap 8 and the hydraulic piston 6. One or more hydraulic channels, which extend through the hydraulic block 3 or the element 4, preferably open into the hydraulic chamber 11 to allow hydraulic medium to flow into or out of the hydraulic chamber 11 when the hydraulic piston 6 moves.

The covering caps 8, 9 are both ring-shaped and each comprise an annularly extending side wall 12 or 13. The side walls 12, 13 are in particular configured such that they extend in a circular ring-shaped manner. Whereas the covering cap 8 has a closed base 14, the covering cap 9 has an opening 15 in its base, through which a drive shaft for the spindle drive 7 can be passed. Due to the annular configuration of the side walls 12, 13, the covering caps 8, 9 represent annular bodies 16, 17 which are fastened to the element 4.

An advantageous fastening system 18 is provided for fastening the annular bodies 16, 17 to the element 4, which is used for fastening on both covering caps 8, 9.

As FIG. 1 shows, on its outer walls coaxially to the through-bore 5, the element 4 or the hydraulic block 3 comprises a respective annular groove-shaped recess 19 which also each extend in a circular ring-shaped manner. The fastening system 18 will now to be explained in more detail with reference to the covering cap 8. The fastening system 18 comprises a collar 20 which is formed on the side wall 12 and projects radially outward at the free end of the side wall 12. The recess 19 comprises a lateral inner wall 21 and a lateral outer wall 22 which are opposite one another and oriented substantially parallel to one another. The distance between the lateral inner wall 21 and the lateral outer wall 22, i.e. the clear width of the recess 19, corresponds at least substantially to the width of the side wall 12 in the region of the collar 20. The lateral inner wall 21 forms an advantageous retaining contour 23 for the side wall 12, which prevents a radially inward displacement of the side wall 12, in particular the collar 20. In this case, the inward displacement is prevented in a form-fitting manner.

In the lower half, FIG. 1 shows a preassembly step, in which the covering cap 8 is already pushed or inserted axially into the recess 19. The lateral inner wall 21 preferably has an outer diameter that is slightly larger than the inner diameter of the side wall 12 in the region of the collar 20, so that a radially acting interference fit is created between the side wall 12 and the side wall 21 when the side wall 12 is pushed into the recess 19. The covering cap 8 is thus pressed axially onto the lateral inner wall 21. This ensures that the covering cap 8 is already fixedly connected to the element 4 during preassembly.

In a subsequent step, in which the fastening system 4 is completed, material of the element 4 is plastically deformed from radially outside in the direction of the side wall 12, in particular by a caulking process, so that the material of the element 4 engages behind the collar 20, thereby holding it in a form-fitting manner axially in the recess 19. The deformed state is shown at the top in FIG. 1, while the as yet undeformed state of the element 4 is shown at the bottom. The press fit between the side wall 12 and the lateral inner wall 21 of the element 4 ensures that the covering cap 4 is held securely on the element 4 when the material of the element 4 is caulked and that the material of the element 4 engages behind said covering cap. This also reliably prevents subsequent unintentional loosening of the covering cap 8, because the lateral inner wall 21 reliably prevents the side wall 12 from pulling radially out of its rear engagement. This ensures a high load capacity of the covering cap 8 on the hydraulic block 3, so that even high hydraulic pressures can be generated and used in the hydraulic chamber 11. The same applies to the fastening system 18 on the covering cap 9, which is configured to corresponding to that on the covering cap 8.

Further embodiment examples of the fastening system 18 will be discussed in more detail in the following.

Figure 2:
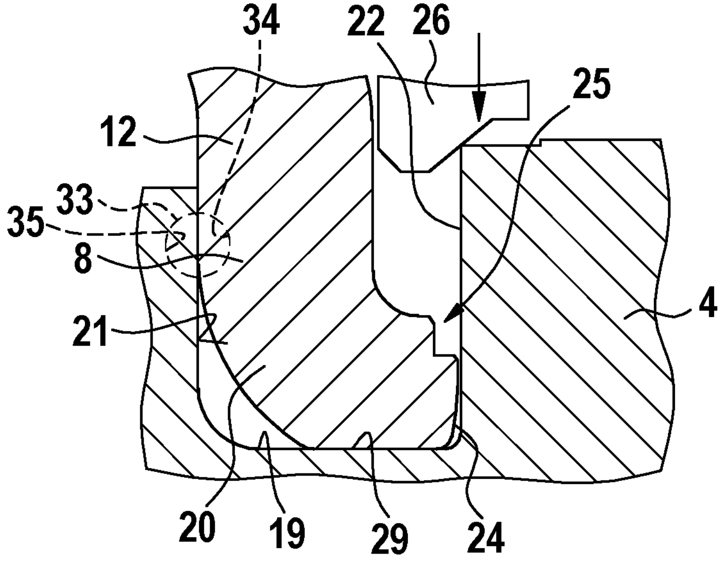
FIG. 2 shows a detail view of the hydraulic system according to a second embodiment example of the present invention.

FIG. 2 therefore shows an advantageous second embodiment example, which differs from the above-described embodiment example in that, at its lower end in the picture, i.e. close to the free axial end face, the collar 20 comprises a radial projection 24 that extends over the entire perimeter of the collar 20. Due to the radial projection 24, a section having a greater radial distance to the lateral outer wall 22 remains on the collar 20. This section serves as a sealing section 25 of the collar 20. The radial projection ensures that, when the side wall 12 with the collar 20 is inserted into the recess 19, the sealing section 25 remains spaced apart from the material of the element 4 and can therefore not be damaged, for example scratched, by it. In the subsequent caulking process with a caulking tool 26, which is shown as an example in FIG. 2, so that the material of the element 4 is plastically deformed and pressed or pushed onto the sealing section 25, the sealing section 25 remains intact and thus undamaged, so that a high sealing effect between the element 4 under the covering cap 8 is ensured.

FIG. 2 further shows an optional sealing element 33, which acts between the side wall 12 and the element 4 in the recess 19. According to the present embodiment example, the sealing element 33 is configured as a sealing ring, in particular an O-ring, which is held clamped between the inner side of the side wall 12 and the lateral inner wall 21. The sealing ring is disposed coaxially to the ring shape of the side wall 12 and elastically tensioned or deformed between the side wall 12 and the element 4. The side wall 12 and the element 4 in particular comprise a receiving groove 34, 35 which, in the assembled state of the annular body 16, lie opposite one another in the recess 19 and are configured to respectively receive the sealing ring in regions, so that the sealing ring is permanently securely held between the two elements. Optionally, only the annular body 16, 17 or only the element 4 comprises a receiving groove for the sealing element 33. Alternatively, the sealing element 33 is disposed at a different location between the annular body 16, 17 and the element 4, for example at the base of the recess 19, as explained in more detail with reference to the embodiment example shown in FIG. 3. The sealing element 33 can generally be disposed and act at different locations between the element 4 and the annular body 16, 17, irrespective of the further configuration of the fastening system 18.

Figure 3:
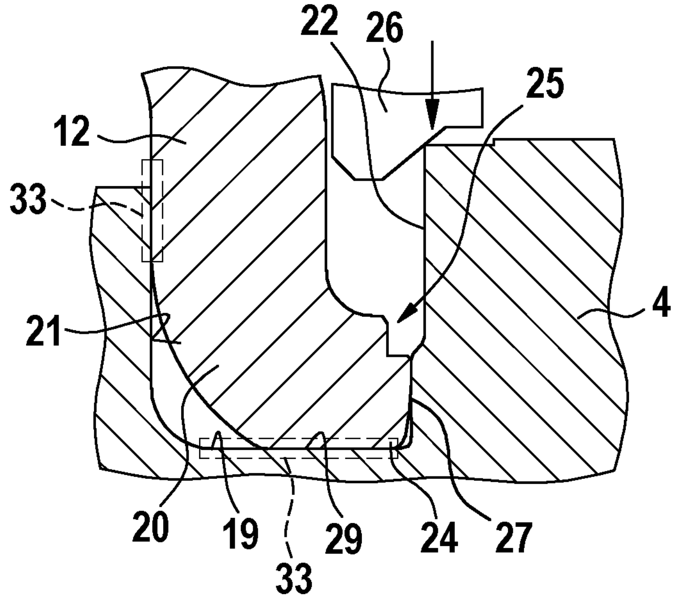
FIG. 3 shows a detail view of a fastening system of the hydraulic system according to a third embodiment example of the present invention.

The embodiment example of FIG. 3 differs from the above-described embodiment example in that the lateral outer wall 22, too, comprises a radial projection 27 which, when the side wall 12 is inserted in the recess, 19 lies at the level of the radial projection 24. The radial projection 27 increases the protection of the sealing section 25 from damage during assembly. The clear width of the recess 19 in the region of the radial projection 24 and/or the radial projection 27 is in particular selected such that the collar 20 has to be pressed into the recess 19 as a whole, so that an interference fit is also created on the radial outer side or on the radial projection 24, which further increases the subsequent load capacity or robustness of the fastening system 18.

The sealing element 33 is optionally provided in the embodiment example of FIG. 3 as well. FIG. 3 shows examples of the positioning of the sealing element 33 at different locations. At a first location, the sealing element 33 lies between the inner side of the side wall 12 and the lateral inner wall 21 of the recess 19 like the sealing ring in the embodiment example of FIG. 2. In contrast to the above-described embodiment example, however, the sealing element is configured as a gasket or sealant, which is applied to the side wall 12 or the lateral inner wall 21 prior to assembly. The sealing element 33 is alternatively configured as a sealing ring or O-ring in this embodiment example as well.

According to a further embodiment example, the sealing element 33 is disposed between the base 29, the recess 19 and the axial end face of the side wall 12, or in particular tensioned and elastically deformed by the side wall 12 and the element 4 in the assembled position. In this location, too, the sealing element 33 can alternatively be configured as the above-described sealing ring, in particular an O-ring.

Figure 4:
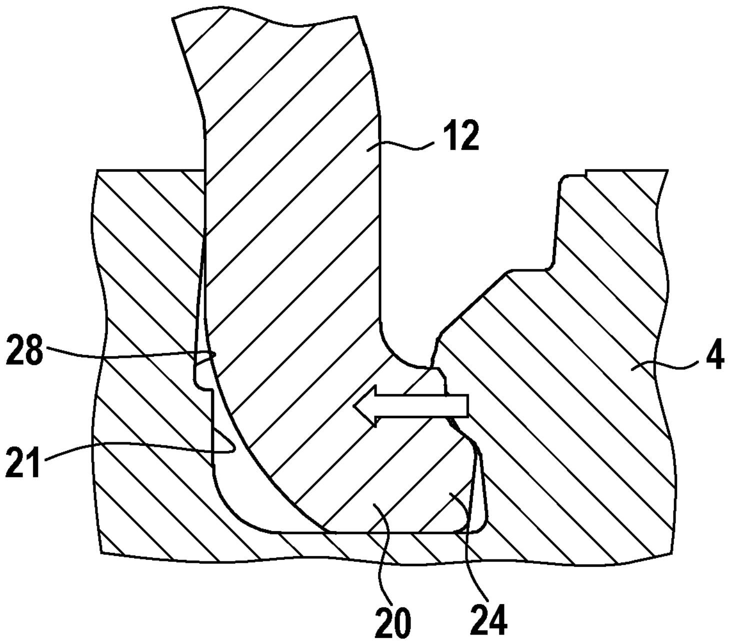
FIG. 4 shows a detail view of a fastening system of the hydraulic system according to a fourth embodiment example of the present invention.

FIG. 4 shows a further embodiment example, which differs from the above-described embodiment example in particular in that the lateral inner wall 21 comprises an undercut 28. During the caulking process or during the deformation of the element 4 for engaging behind the collar 20 by the aforementioned caulking tool, the side wall 12 is pressed radially into the undercut 28 in some regions, so that the side wall 12 is prevented in a form-fitting manner from being pulled out at the lateral inner wall 28. This further increases the load capacity of the covering cap 8.

Figure 5:
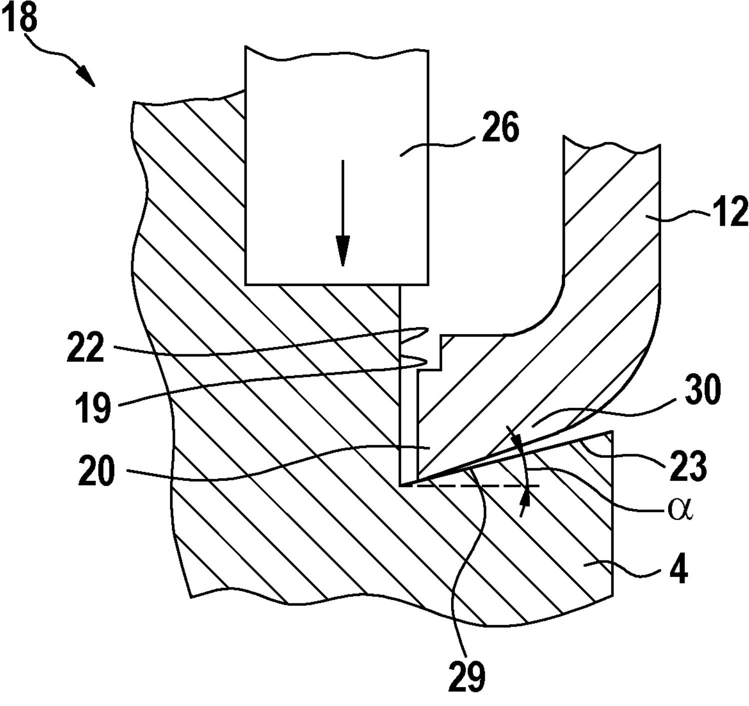
FIG. 5 shows a detail view of a fastening system of the hydraulic system according to a fifth embodiment example of the present invention.

FIG. 5 shows another embodiment example of the fastening system 18, which differs from the above-described embodiment examples in that the recess 19 does not have a lateral inner wall 21 that extends parallel to the lateral outer wall 22. Rather, in this embodiment example, the base 29 of the recess 19, which in the above-described embodiment examples is oriented perpendicular to the axial insertion direction of the lateral inner wall 21, is oriented inclined at an angle α to the vertical to form the retaining contour 23 for the collar 20. The collar 20 also has an inclined underside and/or contact side 30, which, in the assembled state, extends at least substantially parallel to the base 29. The inclination of the base 29 is selected such that the base 29 encloses an angle α0 with the lateral outer wall 22 that is less than 90°. During the caulking process with a caulking tool 26, as also shown as an example in FIG. 5, the side wall 12 is prevented in a form-fitting and force-fitting manner by the inclined base 29 from moving away radially inward, so that the material of the element 4 or hydraulic block 3 advantageously engages behind said side wall.

Figure 6:
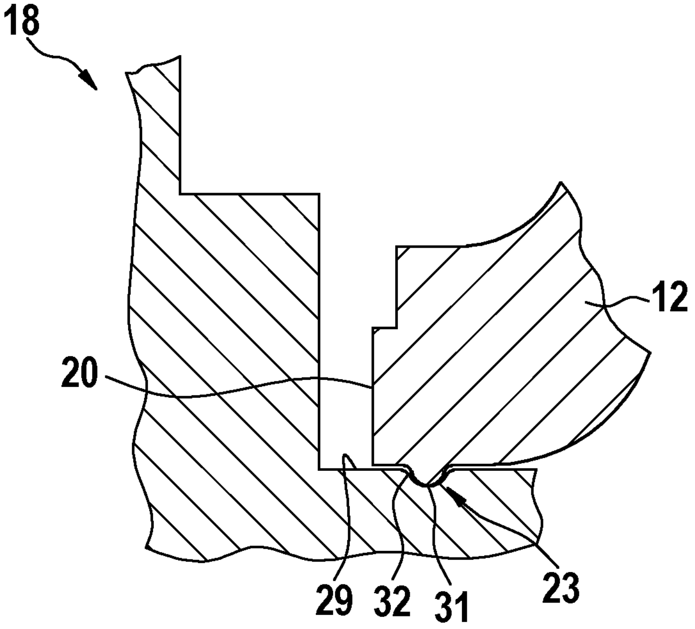
FIG. 6 shows a detail view of a fastening system of the hydraulic system according to a sixth embodiment example of the present invention.

FIG. 6 shows a further embodiment example in which the fastening system 18 likewise manages without the lateral inner wall 21. According to this initial example, at its end 29 facing the base, the collar 20 comprises an annular projection 31 that engages in an annular groove 32 of the base 29 during assembly. The retaining contour 23 is thus formed by the annular groove 32 in the recess 19, which interacts in a radially form-fitting manner with the projection 31. Here, too, a retraction of the side wall 12 during the caulking process is reliably prevented.

The invention claimed is:

1. A fastening system for fastening an annular body, the fastening system comprising:

the annular body including an annularly extending side wall having an outer side and an inner side; and a collar which projects radially from the outer side to an element which includes a receiving region for the collar;

wherein, for fastening the annular body to the element, the element is plastically deformable in such a way that a material of the element is displaceable to engage behind the collar, the element includes an annular recess having a caulkable lateral outer wall and having a retaining contour which is radially spaced apart from the lateral outer wall, and the retaining contour is configured to interact in a form-fitting manner with the collar at least in a direction facing away from the lateral outer wall.

2. The fastening system according to claim 1, wherein the annular body is a covering cap or an end shield.

3. The fastening system according to claim 1, wherein the element is a housing or a hydraulic block.

4. The fastening system according to claim 1, wherein the side wall and the recess are configured such that they extend in a circular ring-shaped manner.

5. The fastening system according to claim 1, wherein the collar ends radially spaced apart from the lateral outer wall of the recess.

6. The fastening system according to claim 1, wherein the collar forms an interference fit with the lateral outer wall of the recess.

7. The fastening system according to claim 6, wherein the recess includes an annular projection which projects radially from the lateral outer wall into the recess to form the interference fit.

8. The fastening system according to claim 1, wherein the retaining contour is configured as a lateral inner wall of the recess opposite to the lateral outer wall.

9. The fastening system according to claim 8, wherein the lateral inner wall is configured such that it extends at least substantially parallel to the lateral outer wall.

10. The fastening system according to claim 8, wherein the lateral inner wall is configured to form an interference fit with the inner side of the side wall of the annular body.

11. The fastening system according to claim 8, wherein the retaining contour is formed by an inclined base of the recess.

12. The fastening system according to claim 1, wherein the lateral inner wall includes an undercut.

13. The fastening system according to claim 1, wherein the collar includes a projection which projects radially outward for forming a press fit with the lateral inner wall of the recess and, axially spaced apart from the projection, a sealing section which is configured to interact in a sealing manner with caulked material of the element.

14. The fastening system according to claim 1, wherein the element or the annular body includes at least one elastically deformable sealing element which interacts in a sealing manner with the annular body or the element.

15. A fastening system for fastening an annular body, the fastening system comprising:

the annular body including an annularly extending side wall having an outer side and an inner side; and a collar which projects radially from the outer side to an element which includes a receiving region for the collar;

wherein, for fastening the annular body to the element, the element is plastically deformable in such a way that a material of the element is displaceable to engage behind the collar, the element includes an annular recess having a caulkable lateral outer wall and having a retaining contour which is radially spaced apart from the lateral outer wall, and the retaining contour is configured to interact in a form-fitting manner with the collar at least in a direction facing away from the lateral outer wall, wherein the retaining contour is configured as a lateral inner wall of the recess opposite to the lateral outer wall, wherein the retaining contour is formed by an annular groove formed in a base of the recess which is inclined perpendicular to the lateral outer wall, wherein the collar and/or the side wall include an annular projection on the end face of the collar or side wall, respectively, that can be inserted into the annular groove.

16. A hydraulic device for a motor vehicle, comprising:

an element which is configured as a hydraulic block and includes at least one opening for forming a chamber; and at least one annular body which is configured as a covering cap and/or as an end shield, and which closes the chamber;

wherein the annular body is fastened to the element using a fastening system including:

an annularly extending side wall of the annular body, the side wall having an outer side and an inner side; and a collar which projects radially from the outer side to the element which includes a receiving region for the collar;

wherein, for fastening the annular body to the element, the element is plastically deformable in such a way that a material of the element is displaceable to engage behind the collar, the element includes an annular recess having a caulkable lateral outer wall and having a retaining contour which is radially spaced apart from the lateral outer wall, and the retaining contour is configured to interact in a form-fitting manner with the collar at least in a direction facing away from the lateral outer wall.

17. The hydraulic device according to claim 16, wherein the hydraulic device is a braking device for a motor vehicle or a brake booster.

* * * * *